(12) United States Patent
Gupta

(10) Patent No.: US 8,533,271 B2
(45) Date of Patent: Sep. 10, 2013

(54) ELECTRONIC MAIL RECOVERY UTILIZING RECORDED MAPPING TABLE

(75) Inventor: Tarunkumar Gupta, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 934 days.

(21) Appl. No.: 11/351,372

(22) Filed: Feb. 10, 2006

(65) Prior Publication Data
US 2007/0192416 A1    Aug. 16, 2007

(51) Int. Cl.
  G06F 15/16  (2006.01)
  G06F 7/00   (2006.01)
  G06F 17/00  (2006.01)

(52) U.S. Cl.
  USPC ........... 709/206; 709/204; 709/205; 707/661; 707/667; 707/673

(58) Field of Classification Search
  USPC ......... 709/202, 206, 214, 204, 205; 707/204, 707/1, 661, 662, 665, 667, 668, 672, 673
  See application file for complete search history.

(56) References Cited

U.S. PATENT DOCUMENTS

| | | | | | |
|---|---|---|---|---|---|
| 5,890,163 | A  * | 3/1999  | Todd     | ............. | 707/200 |
| 5,951,636 | A  * | 9/1999  | Zerber   | ............. | 709/202 |
| 5,978,836 | A  * | 11/1999 | Ouchi    | ............. | 709/206 |
| 6,170,002 | B1 * | 1/2001  | Ouchi    | ............. | 709/206 |
| 6,247,076 | B1 * | 6/2001  | Ono      | ............. | 710/65  |
| 6,636,733 | B1 * | 10/2003 | Helferich| ............. | 455/412.2 |
| 6,728,714 | B1 * | 4/2004  | Doganata et al. | ...... | 707/10 |
| 7,039,830 | B2 * | 5/2006  | Qin      | ............. | 714/13  |
| 7,058,664 | B1 * | 6/2006  | Hsu      | ............. | 707/200 |
| 7,165,082 | B1 * | 1/2007  | DeVos    | ............. | 707/203 |
| 7,386,663 | B2 * | 6/2008  | Cousins  | ............. | 711/114 |
| 7,546,346 | B2 * | 6/2009  | Ouchi    | ............. | 709/206 |
| 7,673,000 | B2 * | 3/2010  | Smoot et al. | ......... | 709/206 |
| 7,913,053 | B1 * | 3/2011  | Newland  | ............. | 711/172 |
| 2001/0044910 | A1 * | 11/2001 | Ricart et al. | ....... | 714/6 |
| 2002/0026485 | A1 * | 2/2002  | Sugawara | ............. | 709/206 |
| 2002/0046248 | A1 * | 4/2002  | Drexler  | ............. | 709/206 |
| 2002/0122543 | A1 * | 9/2002  | Rowen    | ............. | 379/93.01 |
| 2002/0169840 | A1 * | 11/2002 | Sheldon et al. | ...... | 709/206 |
| 2003/0065728 | A1 * | 4/2003  | Milovanovic | ........ | 709/206 |
| 2003/0163538 | A1 * | 8/2003  | Yeh et al. | ......... | 709/206 |
| 2004/0093385 | A1 * | 5/2004  | Yamagata | ............. | 709/206 |
| 2004/0133645 | A1 * | 7/2004  | Massanelli et al. | ... | 709/206 |
| 2004/0167941 | A1 * | 8/2004  | Prahlad et al. | ...... | 707/204 |
| 2004/0212639 | A1 * | 10/2004 | Smoot et al. | ........ | 345/752 |
| 2004/0215724 | A1 * | 10/2004 | Smoot et al. | ........ | 709/206 |
| 2004/0243652 | A1 * | 12/2004 | Furuta   | ............. | 707/204 |
| 2005/0010775 | A1 * | 1/2005  | Hsu      | ............. | 713/176 |
| 2005/0015451 | A1 * | 1/2005  | Sheldon et al. | ...... | 709/206 |
| 2005/0283461 | A1 * | 12/2005 | Sell et al. | ......... | 707/1 |
| 2006/0010322 | A1 * | 1/2006  | Novack et al. | ....... | 713/170 |
| 2006/0020674 | A1 * | 1/2006  | Bruce et al. | ........ | 709/206 |
| 2006/0031357 | A1 * | 2/2006  | Misra et al. | ........ | 709/206 |

(Continued)

*Primary Examiner* — Tae Kim
(74) *Attorney, Agent, or Firm* — Kilpatrick Townsend & Stockton LLP

(57) ABSTRACT

A method for retrieving deleted data is described. The present method includes receiving a request to locate deleted data. The request includes criteria for approximating said deleted data. The deleted data is stored in a recovery log. The method also includes receiving an affirmation that the located deleted data is the deleted data being requested. The affirmation is by the requester of said deleted data. The method further includes transmitting the recovered data to the requester upon receiving the affirmation.

23 Claims, 9 Drawing Sheets

(56) References Cited

U.S. PATENT DOCUMENTS

| | | | |
|---|---|---|---|
| 2006/0041505 A1* | 2/2006 | Enyart | 705/40 |
| 2006/0123087 A1* | 6/2006 | Gibson | 709/206 |
| 2006/0149725 A1* | 7/2006 | Ritter | 707/5 |
| 2006/0190830 A1* | 8/2006 | Gerstl et al. | 715/757 |
| 2006/0224674 A1* | 10/2006 | Buchheit et al. | 709/206 |
| 2007/0027955 A1* | 2/2007 | Voss et al. | 709/206 |
| 2007/0067399 A1* | 3/2007 | Kulkarni et al. | 709/206 |
| 2007/0100950 A1* | 5/2007 | Bornstein et al. | 709/206 |
| 2007/0136388 A1* | 6/2007 | Voss et al. | 707/200 |
| 2007/0168435 A1* | 7/2007 | Moraca et al. | 709/206 |

\* cited by examiner

ELECTRONIC MAIL RECOVERY UTILIZING RECORDED MAPPING TABLE

TECHNICAL FIELD

Embodiments of the present invention are related to electronic mail systems. More particularly, embodiments of the present invention relate to systems that facilitate the recovery of deleted electronic mail messages.

BACKGROUND ART

In a computer system or in a network of computer systems, a common mechanism for communication is electronic mail, e.g., e-mail. E-mail enables a computing system user to communicate data to another computing system user or to a plurality of users. It is noted that nearly anything that is in digital form can be sent from one user to another user via electronic mail.

In a condensed practical example of e-mail, a computer user utilizes an e-mail agent (computer mail program) to compose an e-mail message. The e-mail message contains the e-mail address of one or more recipients. The e-mail agent passes the message to a transport service for delivery to the mailbox of each recipient. Each recipient may or may not use the same e-mail agent as the sender. Once delivered, the recipient utilizes their particular e-mail agent to read the e-mail message.

By virtue of electronic mail being significantly faster and substantially less expensive than regular postal mail, a large percentage of individuals, educational institutions, governments, and businesses, both large and small, have embraced electronic mail as a solution, in part, to their communication needs. In fact, e-mail communication has become a necessary means of communication.

Within many electronic mail programs, when a user deletes an e-mail message, the e-mail message is not really deleted. The deleted e-mail may be sent to a deleted e-mail folder within the email application and from which the user then deletes the deleted email. While in the deleted folder, a deleted e-mail message is typically still locally present and can be recovered. However, once the user deletes the e-mail message from the deleted folder, the e-mail message is usually lost.

While this may be acceptable for those entities having low electronic mail volume or non-critical e-mail, e.g., individual users and small offices, many businesses, companies, educational institutions and government agencies desire to retain their electronic mail. Retaining a history of deleted electronic mail is becoming more and more commonplace for, but is not limited to, tracking intra-office and/or inter-office communication, evidentiary support in litigious proceedings, tracking flow of data associated with the electronic mail, or nearly any other reason for retaining electronic mail.

Currently, in order to recover an e-mail message for a user, some entities utilize recovery logs to store deleted electronic mail. In this instance, when a user wants to recover a deleted e-mail, the entity's administrator needs to be informed of the exact time the e-mail message was deleted by the electronic mail garbage collector process. By knowing the exact time, the administrator would then guess which log the deleted e-mail message was placed, as defined by the DELETE/INSERT operation associated therewith. After guessing the log(s), the administrator would then need to supply the list of log(s) to an email recovery script. This method is error prone and tedious because the wrong log may have been guessed.

If more than one e-mail was deleted and it encompasses more than one log, then the guess work as to which logs the deleted e-mail was placed becomes a non-trivial problem for the administrator. If the administrator chooses more than one log, then guesswork becomes a performance hit by virtue of the time required to mine all those logs. The email recovery script then would mine the logs to recover the complete email data (which may be spread across more than one table). Because of the guesswork involved in determining the logs for e-mail recovery, the whole process becomes a method of trial and error. This can cause a retrieval time approximating twenty minutes or more for a single message recovery. Additionally, the administrator may not be able to selectively recover the deleted electronic mail.

Thus, many current electronic mail and associated e-mail retrieval systems may not provide an efficient mechanism for storing and/or retrieving of deleted electronic mail. Accordingly, there exists a need for an efficient method and system for retrieving deleted electronic mail from recovery logs or similar data repositories.

DISCLOSURE OF THE INVENTION

Accordingly, embodiments of the present invention are drawn to a method and system for efficient retrieval of deleted data, particularly deleted electronic mail messages. Embodiments of the present invention use a plurality of tables in one or more recovery logs to store a user's deleted electronic mail in which the tables are configured to store portions of each electronic mail. Upon a message being deleted, its identification and identification of the current recovery log are stored in a map. Embodiments of the present invention provide for rapid and efficient retrieval of deleted electronic mail. Embodiments of the present invention also provide for selectively retrieving deleted electronic mail. Embodiments of the present invention additionally provide transmitting the retrieved electronic mail to the requester.

In an embodiment, when an e-mail message is to be deleted, a mapping of a unique identification code of the e-mail message and the currently active recovery log is stored into a mapping table of the computer system. The mapping table also stores header information related to the deleted message, e.g., sender information, receiver information, subject text, etc. In one embodiment, the MIME portion of the e-mail message is stored in the active recovery log after deletion by the garbage collector. The remainder of the e-mail message can be ignored, in this embodiment.

Upon e-mail retrieval, a graphical user interface can be employed by a requesting party. Using such a system, a user inputs some identification material (query information) regarding the e-mail message to be recovered, e.g., sender, receiver, subject, date, etc. The mapping table is then searched for a listing of e-mail messages that match the query information. This listing may be displayed to the user using the graphical user interface. The user is then allowed to select, e.g., highlight, which e-mail message is to be retrieved. The system then accesses the mapping table for each selected e-mail message using the message's unique identification code. Based on the mapping table, the recovery log that stores the MIME information for the e-mail message is known. The system then scans the identified recovery log for the proper MIME information for the selected message to be recovered. Once retrieved, the system forwards the MIME information to a mail server, e.g., SMTP server, which converts the MIME information back to a recovered e-mail message, which may then be forwarded to the in-box of the requesting party. In this embodiment, there is a performance improvement since only MIME information is mined from the recovery log which was stored in a single relational table.

Advantages of embodiments of the present invention, as will be shown below, may include, but is not limited to, logically storing deleted e-mail messages, querying a mapping table containing information related to the location of the deleted e-mail message, querying just the particular recovery log in which the deleted e-mail message is stored rather than scanning any and all active recovery logs, retrieving the deleted e-mail message from a table, within the recovery log, that contains the MIME information associated with the deleted e-mail message while ignoring other information contained within various other tables. These embodiments advantageously provide decreased recovery time for retrieving deleted e-mail messages, user selectability of recoverable e-mail messages, and forwarding of those recovered e-mail message to the user's e-mail inbox.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Embodiments for a method and system for retrieving electronic mail using a mapping table is described. Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Embodiments of the present invention are discussed primarily in the context of a relational database having a data recovery feature, e.g., recovery logs, and a log mining feature operable therewith. However, it is noted that embodiments of the present invention can be utilized by other software applications having database-like functionalities that may be configured to utilize recovery logs and mining features including, but not limited to, a database application.

Figure 1:
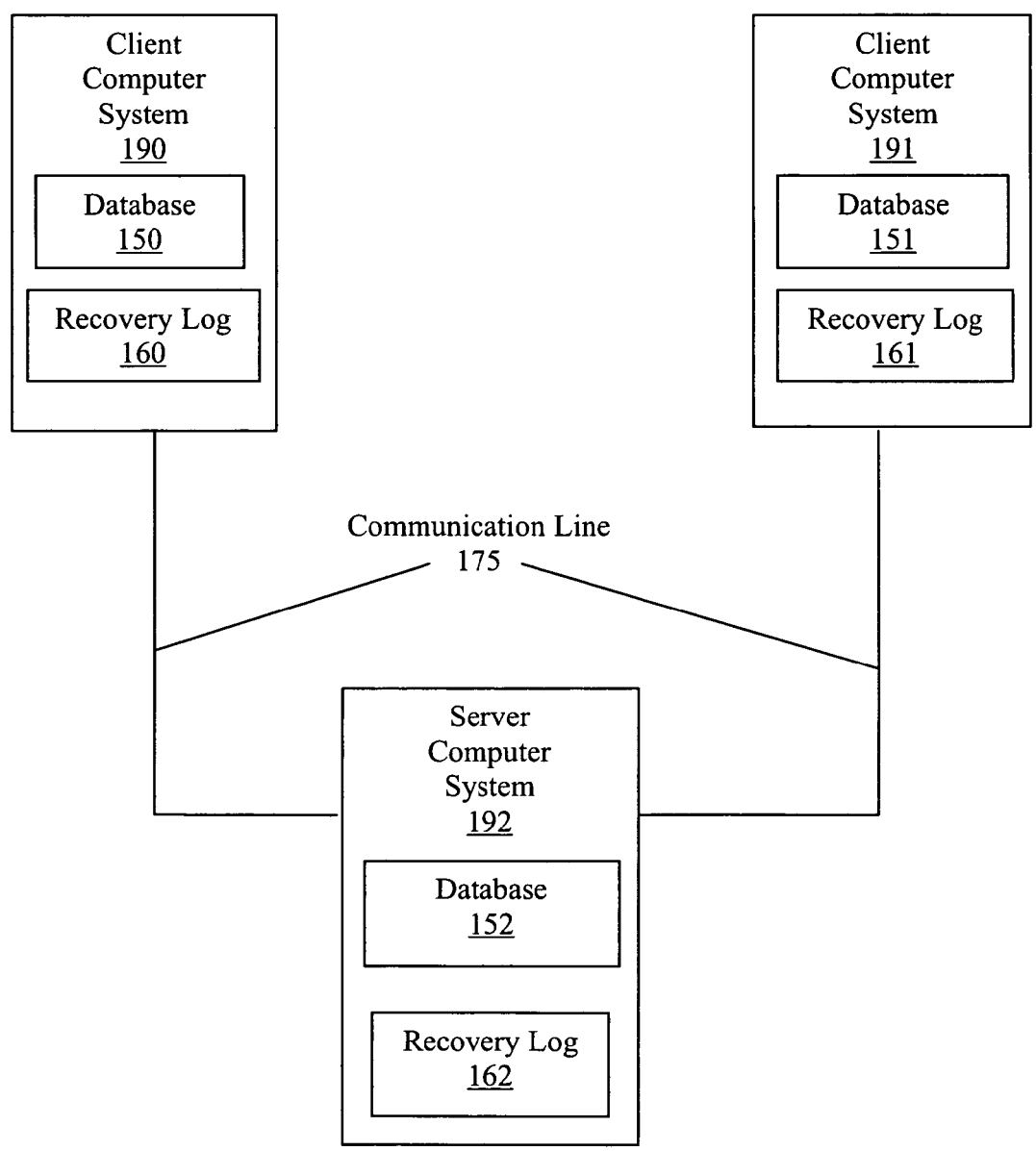
FIG. 1 is a block diagram of an exemplary network environment in which embodiments of the present invention may be practiced, in accordance with embodiments of the present invention.

FIG. 1 is a block diagram illustrating an exemplary client-server computer system network, e.g., network 100, upon which embodiments of the present invention may be practiced. Network 100 may be a communication network located within a firewall of an organization or corporation (an "Intranet"), or network 100 may represent a portion of the World Wide Web or Internet. Client (or user) computer systems 190 and 191 and server computer system 192 are communicatively coupled via a communication line 175; the mechanisms for coupling computer systems over the Internet or over Intranets are well known in the art. This coupling can be accomplished over any network protocol, wired or wireless, that supports a network connection, such as IP (Internet Protocol), TCP (Transmission Control Protocol), UDP (User Datagram Protocol), TELNET, NetBIOS, IPX (Internet Packet Exchange), IR (infra red), RF (radio frequency), wireless broadband, Bluetooth, LU6.2, and link layers protocols such as Ethernet, token ring, and ATM (Asynchronous Transfer Mode). Alternatively, client computer systems 190 and 192 can be coupled to server computer system 191 via an input/output port (e.g., a serial port) of server computer system 191; that is, client computer systems 190 and 191 and server computer system 192 may be non-networked devices. It is appreciated that, for simplicity, only two client computer systems and a single server computer system are shown; however, it is understood that network 100 may comprise any number of client computer systems and server computer systems.

Still referring to FIG. 1, shown in client computer system 190 is a database 150, shown in client computer system 191 is a database 151 and shown in server computer system 192 is a database 152, in an embodiment of the present invention. In accordance with embodiments of the present invention, database 150 may be different from database 151 and database 152 and database 151 may be different from database 152. It is noted that in another embodiment of the present invention, databases 150, 151 and 152 may be analogous. In an alterative embodiment, server computer system 192 may have a database 150, 151 or 152 and client computer systems 190 and 191 may not include a database 150, 151 or 152, such that client computer systems 190 or 191 may access a database remotely.

Within each database, e.g., databases 150, 151 and 152, shown is an associated recovery log, e.g., recovery logs 160, 161 and 162, respectively, in an embodiment of the present invention. The recovery log is sometimes called a "redo" log. In an alternative embodiment, each database 150, 151 and 152 may each utilize the same recovery log, e.g., recovery log 160. It is noted that recovery log 160 may be disposed local to the database and/or remote to the database, such that portions of a particular recovery log may be distributed among available computer systems and/or data storage devices. The configuration of which database uses which particular recovery log is dependent, in part, upon system resources and administrator desires, and as such, nearly any configuration can be implemented. It is noted that in the context of the present invention, a recovery log may be utilized for storing deleted electronic mail.

Figure 2:
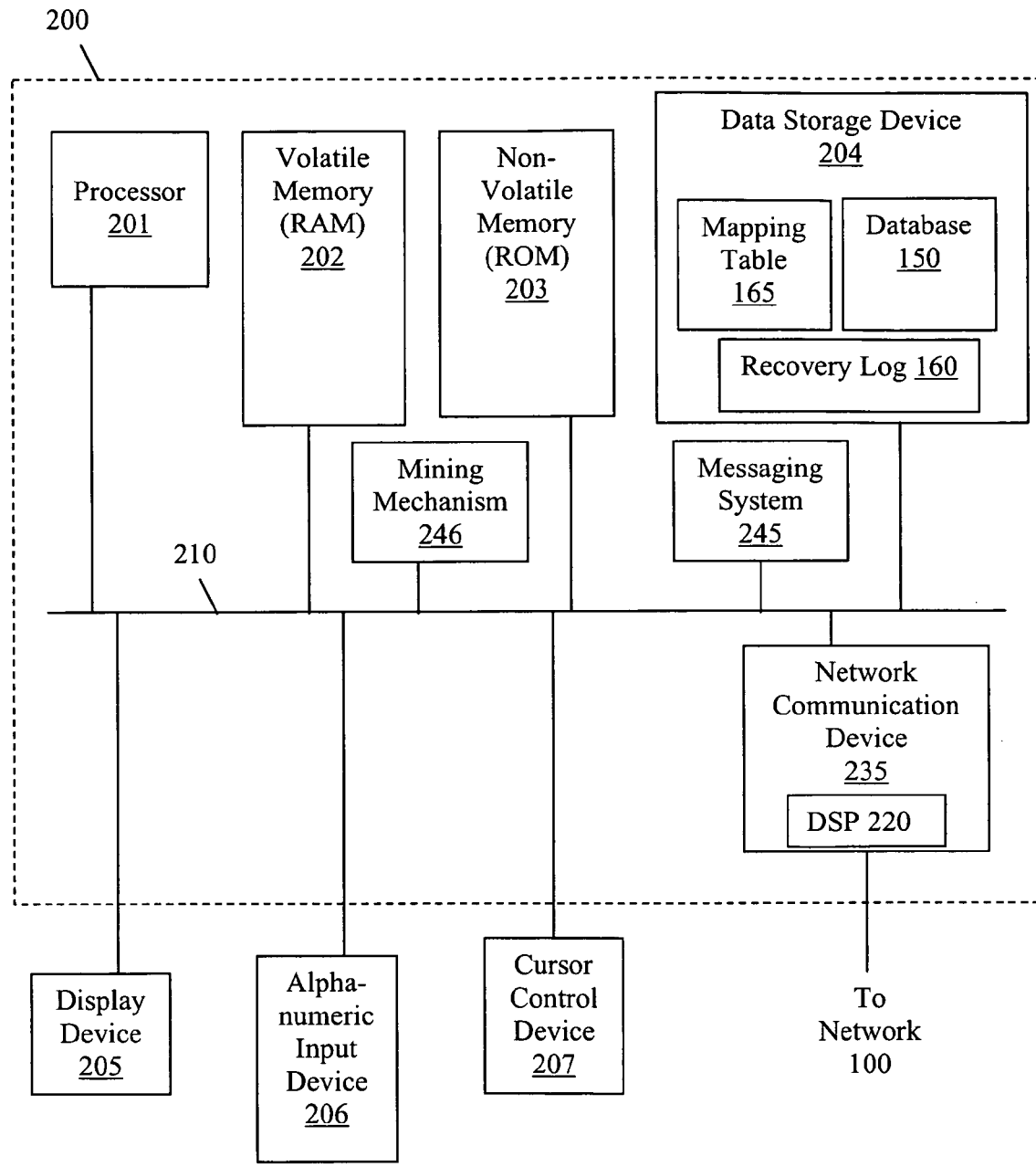
FIG. 2 is a block diagram of a computer system in which embodiments of the present invention may be practiced, in accordance with embodiments of the present invention.

FIG. 2 is a block diagram illustrating components and circuitry of an exemplary computer system 200, which can be implemented within a client computer system, e.g., client computer system 190 and/or 191, and in a server computer system, e.g., server computer system 1920, of FIG. 1, upon which embodiments of the present invention may be practiced. Computer system 200 includes an address/data bus 210 for communicating information, a central processor 201 coupled with the bus for processing information and instructions, a volatile memory 202 (e.g., random access memory, RAM) coupled with the bus 210 for storing information and instructions for the central processor 201 and a non-volatile memory 203 (e.g., read only memory, ROM) coupled with the bus 210 for storing static information and instructions for the processor 201. Optionally, computer system 200 can include dynamic ROM (DROM, not shown). It is noted that in an embodiment, computer system 200 can be configured with a plurality of processors 201.

Computer system 200 of FIG. 2 also includes a data storage device 204 coupled with bus 210 for storing instructions and information. Information may be stored in a database, e.g., database 150, 151 or 152. Data storage device 204 also includes a mapping table 165, in an embodiment of the present invention. Mapping table 165 is enabled to store identifying information related to instances of electronic mail that has been deleted. Data storage device 204 further includes a recovery log, e.g., recovery log 160, in an embodiment of the present invention. Recovery log 160 is enabled to store portions of deleted electronic mail in such a manner that the original e-mail can be reconstructed from those portions, in accordance with embodiments of the present invention. It is noted that recovery log 160 and mapping table 165 are described in detail in FIG. 4.

By virtue of the desire to retain deleted electronic mail for facilitating the retrieval thereof, it is noted that recovery log 160 and mapping table 165 are stored within a data storage device, e.g., 204, in which data is stored in a relatively permanent environment. However, in an alternative embodiment, portions of recovery log 160 and/or mapping table 165 may be combinationally distributed among non-volatile memory, e.g., ROM 203 and a data storage device 204. Data storage device 204 can be, for example, an HDD (hard disk drive), an FDD (floppy disk drive), a compact memory device, a CD-RW (compact disk with write functionality), a DVD-RW or DVD+RW (digital versatile disk with + or − write functionality), a dual layer DVD, a tape drive, etc., and furthermore device 204 can be in multiples or in a combination thereof. Data storage device 204 may also be local or remote to the computer system, plurally instanced, removable, and/or hot swappable (connected or unconnected while computer system is powered).

With reference still to FIG. 2, computer system 200 also includes a network communication device 235, which is coupled to bus 210 for providing a communication link between computer system 200, and a network environment, e.g., network environment 100 of FIG. 1. As such, network communication device 235 enables central processor unit 201 to communicate with other electronic systems coupled to the network, e.g., network 100 of FIG. 1. It should be appreciated that the present embodiment of network communication device 235 is well suited to be implemented in a wide variety of ways. In one example, network communication device 235 is coupled to an antenna and provides the functionality to transmit and receive information over a wireless communication interface, e.g., Bluetooth, IR (infra-red), RF (radio frequency), satellite and the like. In another example, network communication device 235 could be implemented as a modem, wired or wireless. In yet another example, network communication device 235 could be configured as a NIC (network interface card), wired or wireless.

Still referring to FIG. 2, network communication device 235, in an embodiment, includes an optional digital signal processor (DSP) 220 for processing data to be transmitted or data that are received via network communication device 235. Alternatively, processor 201 can perform some or all of the functions performed by DSP 220.

FIG. 2 further includes a mail server 236 coupled to bus 210, enabling computer system 200 to generate, construct, de-construct and process electronic mail from the relational database, in accordance with embodiments of the present invention. In an embodiment, mail server 236 may be an SMTP (simple mail transfer protocol) server. Alternatively, mail server 236 may be another type of mail server including, but not limited to, an SMTP mail server, provided the alternative mail server comprises similar functionality. It is noted that although mail server 236 is shown disposed within computer system 200, in an alternative embodiment, mail server 236 may be remotely coupled to computer system 200. For example, computer system 200 may be computer system 190 of FIG. 1 and wherein mail server 236 may be disposed in computer system 192 of FIG. 1.

Also included in computer system 200 of FIG. 2 is an optional alphanumeric input device 206. In an implementation, device 206 is a keyboard. Device 206 can be physically coupled to computer system 200. Alternatively, device 206 may be wirelessly coupled to computer system 200. Alphanumeric input device 206 can communicate information and command selections to processor 201.

Computer system 200 of FIG. 2 also includes an optional cursor control or directing device (on-screen cursor control) 207 coupled to bus 210 for communicating user input information and command selections to processor 201. In another common implementation, on-screen cursor control device 207 is a mouse or similar pointing device.

Computer system 200 also contains a display device 205 coupled to the bus 210 for displaying information to the computer user.

Still referring to FIG. 2, shown coupled to bus 210 are a messaging system 245 and a mining mechanism 246. Messaging system 245 is enabled to delete electronic mail, via an email garbage collection process, and to receive requests to retrieve deleted electronic mail from a user and to transmit the results of the retrieval request, via a mail server, e.g., mail server 236, to the requesting entity, e.g., a user, an application or other entity.

In accordance with embodiments of the present invention, it is noted that messaging system 245 is enabled to logically organize deleted electronic mail messages within a recovery log, e.g., recovery log 160, or within a plurality of recovery logs, e.g., recovery logs 160, 161 and 162. Logically organizing deleted electronic mail enables mining mechanism 246 to, but is not limited to, rapidly retrieve deleted e-mail messages.

In an embodiment of the present invention, Oracle Collaboration Suite, by Oracle® International Corporation of Redwood City, Calif., USA, may be used as messaging system 245.

Computer system 200 of FIG. 2 is further shown to include a mining mechanism 246 operable therewith for performing portions of an electronic mail message recovery process.

In accordance with embodiments of the present invention, mining mechanism 246 may be comprised, in part, of a recovery mechanism 247. In an embodiment of the present invention, recovery mechanism 247 may be a recovery application programming interface (API) that is configured to retrieve information related to a deleted electronic mail message that is stored in a mapping table, e.g., mapping table 165, and or a recovery log, e.g., recovery log 160. Mining mechanism 246 may be further enabled to utilize the information retrieved from mapping table 165 for querying a recovery log, e.g., recovery log 160, and retrieving therefrom those electronic mail messages matching the information retrieved from a mapping table 165. Mining mechanism 246 may also be enabled to forward the retrieved electronic mail message to a mail server, e.g., mail server 236, which in turn reconstructs the retrieved electronic mail message and transmits the e-mail message to the user requesting its recovery. In an alternative embodiment, mining mechanism 246 is enabled to examine any and all recovery logs communicatively coupled with computer system 200, e.g., 160, 161 and/or 162, in which deleted electronic mail messages may be stored.

In an embodiment of the present invention, mining mechanism 246 may be included within messaging system 245. In an alternative embodiment, mining mechanism 246 may be separate from and operable with messaging system 245. Further, while recovery mechanism 247 is shown disposed within a mining mechanism 246, in an alternative embodiment recovery mechanism 247 may be separate from but operable in conjunction with mining mechanism 246.

In an embodiment of the present invention, Logminer by Oracle Corporation International may be part of messaging system 245 and may be utilized as mining mechanism 246.

Figure 3:
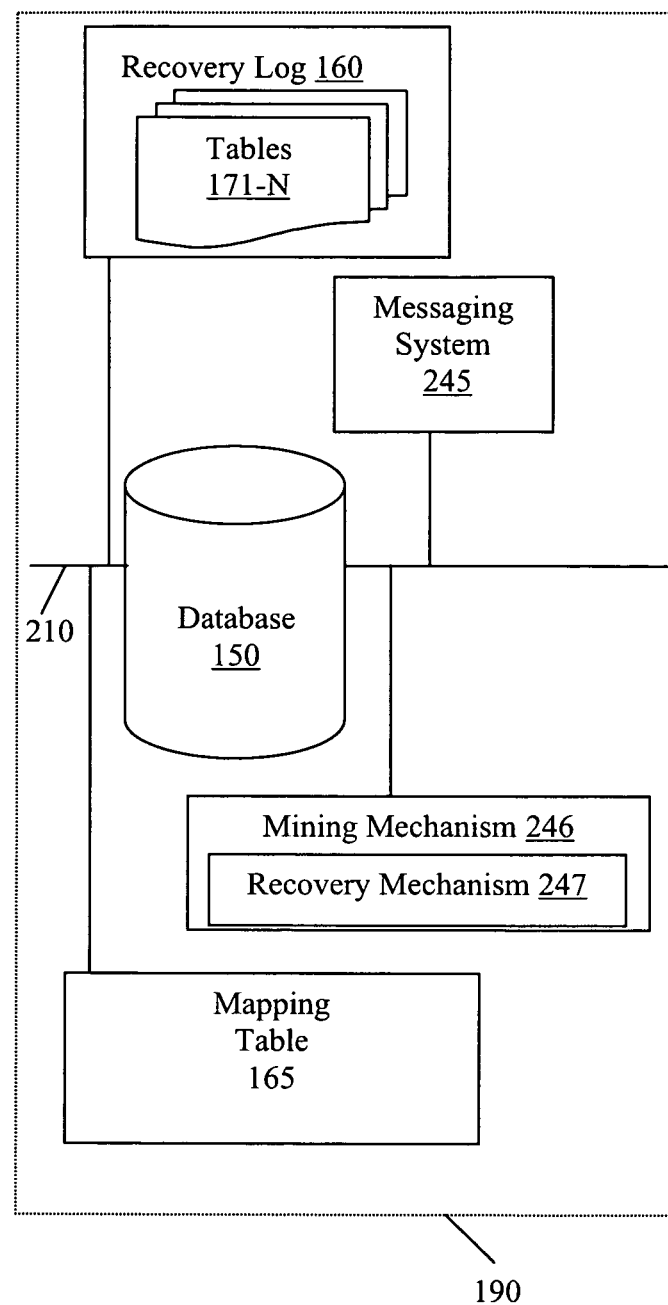
FIG. 3 is a block diagram illustrating a system, including a recovery log, that is utilized to store deleted electronic mail messages and from which deleted electronic mail messages may be retrieved, in accordance with embodiments of the present invention.

With reference to FIG. 3, shown is a client computer system 190, analogous to client computer system 190 of FIG. 1 and/or computer system 200 of FIG. 2. Coupled to client computer system 190 is a database 150. It is noted that database 150 may reside within client computer system 190. In an alternative embodiment, database 150 may be externally disposed and coupled to client computer system 190.

Figure 4:
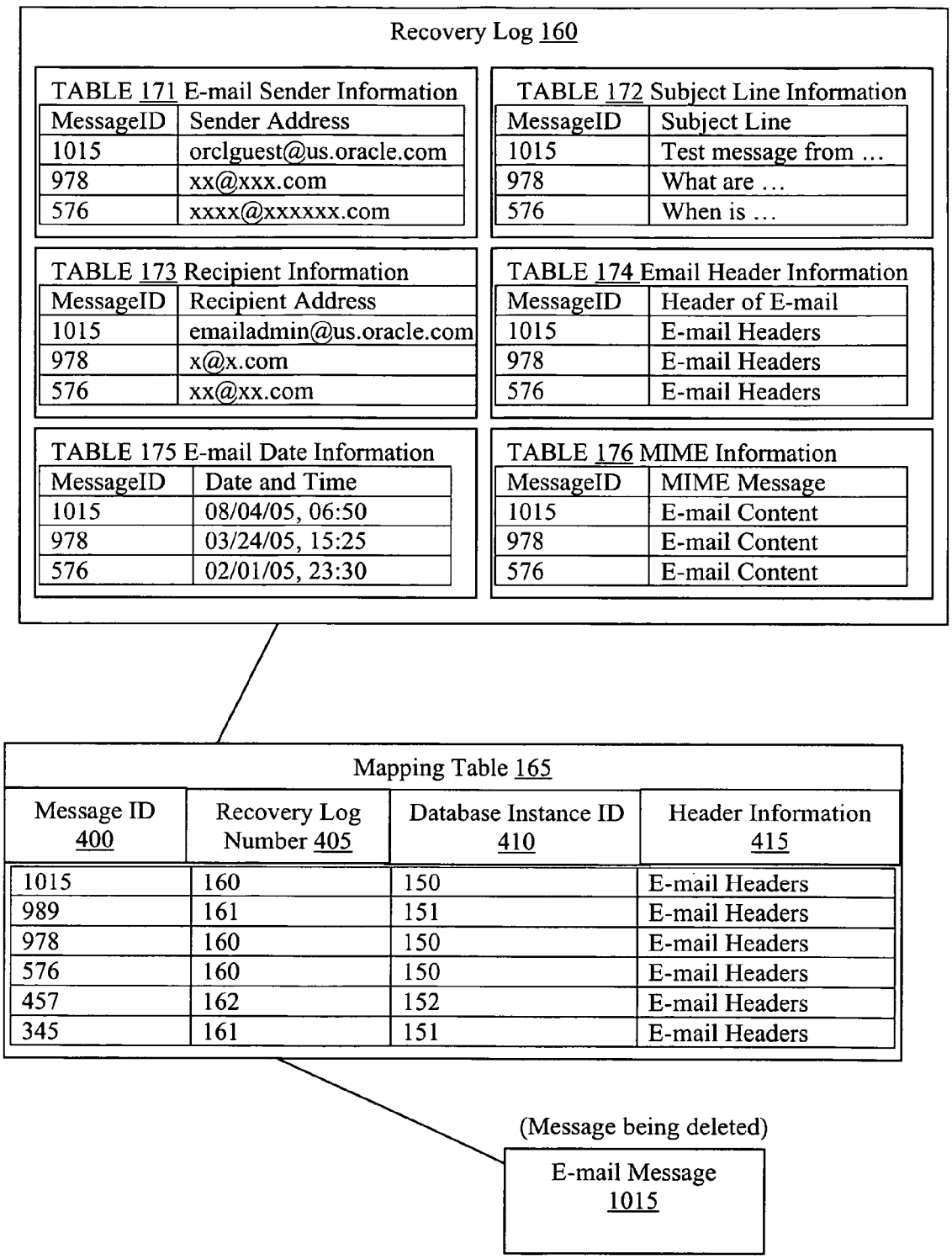
FIG. 4 is a block diagram of a mapping table used in conjunction with a recovery log for recovering electronic email messages, in accordance with embodiments of the present invention.

Also shown in FIG. 3 are messaging system 245, mining mechanism 246, recovery log 160 and mapping table 165, in accordance with embodiments of the present invention. Recovery log 160, described in detail in FIG. 4, is shown to have disposed therein a plurality of tables, e.g., tables 171-N, in an embodiment of the present invention. In an embodiment of the present invention, each table may contain different portions of deleted electronic mail messages. For example, a table 171 may contain sender information, a table 172 may contain addressee information, a table 173 may contain date/time information, a table 174 may contain the subject line information, a table 175 may contain header information, and so on to table N. It is noted that the contents of the tables 171-N are exemplary in nature and as such should not be construed as limiting. In the present embodiment, recovery log 160 is configured to store electronic mail messages in a particular messaging format, e.g., in a MIME (multipurpose Internet message extension) format. It is noted that the e-mail message may be in an alternative message format, provided the alternative message format comprises functionalities similar to the MIME format.

It is further noted that there may be pluralities of recovery logs disposed within a single computer system 190. For example, recovery logs 160, 161, 162 of FIG. 1, may all be disposed within computer system 190. In an embodiment of the present invention, one or more recovery logs may be configured to store information, e.g., deleted electronic mail messages, that are in a multipurpose Internet mail extension (MIME) format. It is additionally noted that in an alternative embodiment, electronic mail messages may be stored in a recovery log configured to store e-mail messages that is in a format compatible with, but not limited to, multipurpose Internet mail extensions. It is particularly advantageous to store deleted electronic mail messages in a recovery log configured for MIME format because a mail server, e.g., an SMTP mail server, is then able reconstruct the e-mail messages, without reformatting, and send the reconstructed electronic mail to the user that requested the recovery of a deleted e-mail message. By storing electronic mail messages in a MIME format, the mail server does not have to reformat the electronic mail message prior to sending, thus advantageously providing a substantial reduction in retrieval time.

It is particularly noted that operable in conjunction with mining mechanism 246 is a recovery mechanism 247. In an embodiment of the present invention, recovery mechanism 247 may be an application programming interface (API) that enables querying mapping tables and recovery logs in conjunction with recovering deleted e-mail messages. In an embodiment, the recovery API 247 used in conjunction with mining mechanism 246 may be located in data storage device 204, non-volatile memory 203, or in a combination thereof.

FIG. 4 shows a recovery log 160, a mapping table 165 and an email message 1015 being deleted, in accordance with embodiments of the present invention. Recovery log 160 and mapping table 165 are analogous to recovery log 160 and mapping table 165 of FIG. 3. Recovery log 160, in accordance with an embodiment of the present invention, may be configured for MIME formatted information. In an exemplary embodiment of the present invention, recovery log 160 contains six tables, e.g., tables 171-176. It is noted that the number of tables contained within a recovery log may vary from one recovery log to another and from one computer system to another. For example, if a recovery log is to retain a small number of deleted e-mail messages, there may be as few as two or three tables and/or as few as two or three rows in the relevant tables. Alternatively, if a recovery log is to retain a large number of deleted electronic mail messages, the number of tables contained therein may range from as few as two to many thousands, or more. Although an illustration of the present invention is discussed as having six tables, it is exemplary in nature and as such should not be construed as a limitation.

In the present example, each table in recovery log 160 contains a particular portion of the deleted e-mail message. For example, table 171 contains information related to the sender of the e-mail message, table 173 contains information related to the recipient of the e-mail message, table 175 contains data and time sent information, table 172 containing information related to the subject line of the e-mail message, table 174 contains information related to the header of the e-mail message and table 176 contains information related to the body of the e-mail. Alternative types of information that may be included in the header information in table 174 and used in conjunction with e-mail message retrieval can include, but is not limited to, an e-mail generated message ID, content type, body content, authentication information, priority information, thread type and index, content class and the like.

It is noted that an administrator of network 100 of FIG. 1 may define the number of tables within a recovery log and may define which portions of the e-mail message are to be placed within a particular table.

Still referring to FIG. 4, tables 171-176 may be configured with a size limit. In an example, each table 171-176 may be configured to store a maximum of ten megabytes of data. Accordingly, if the body (content) of a deleted e-mail message contains fifty megabytes of information, the body may be distributed across at least five tables 176.

Mapping table 165 of FIG. 4 is shown to include a plurality of sections that may include, but is not limited to, message ID 400, recovery log number 405, database instance ID 410 and header information 415, in an embodiment of the present invention. In accordance with embodiments of the present invention, message ID 400 may contain a unique identifier for each instance of a deleted e-mail message, recovery log number 405 may contain an identifier to indicate which recovery log is storing the MME information of the deleted e-mail message, database instance ID 410 may contain information indicating the database in which the associated recovery log is located and header information 415 may contain the header information associated with the deleted e-mail message which mining mechanism 246, in conjunction with recovery mechanism 247, can utilize to recover an instance of a deleted e-mail message.

Within each table 171-176 are shown a message ID number associated with each e-mail message deleted in accordance with embodiments of the present invention. In an example, the e-mail being deleted and subsequently being recovered is e-mail message 1015. In an embodiment of the present invention, an e-mail message is deleted by a user in accordance with the e-mail system operable in computer system 190. Messaging system 245 of FIG. 3 obtains a unique e-mail message identifier, in this example, identifier 1015. Messaging system 245 then propagates the information related to the deleted e-mail message into the appropriate tables within recovery log 160 and also propagates the information into mapping table 165 (as shown in FIG. 4), in an embodiment of the present invention.

It is noted that in the present embodiment, multiple users are associated with recovery log 165. In an alternative embodiment, recovery log 165 may contain information associated with a single user, such that each user is associated with a particular recovery log.

Figure 5A:
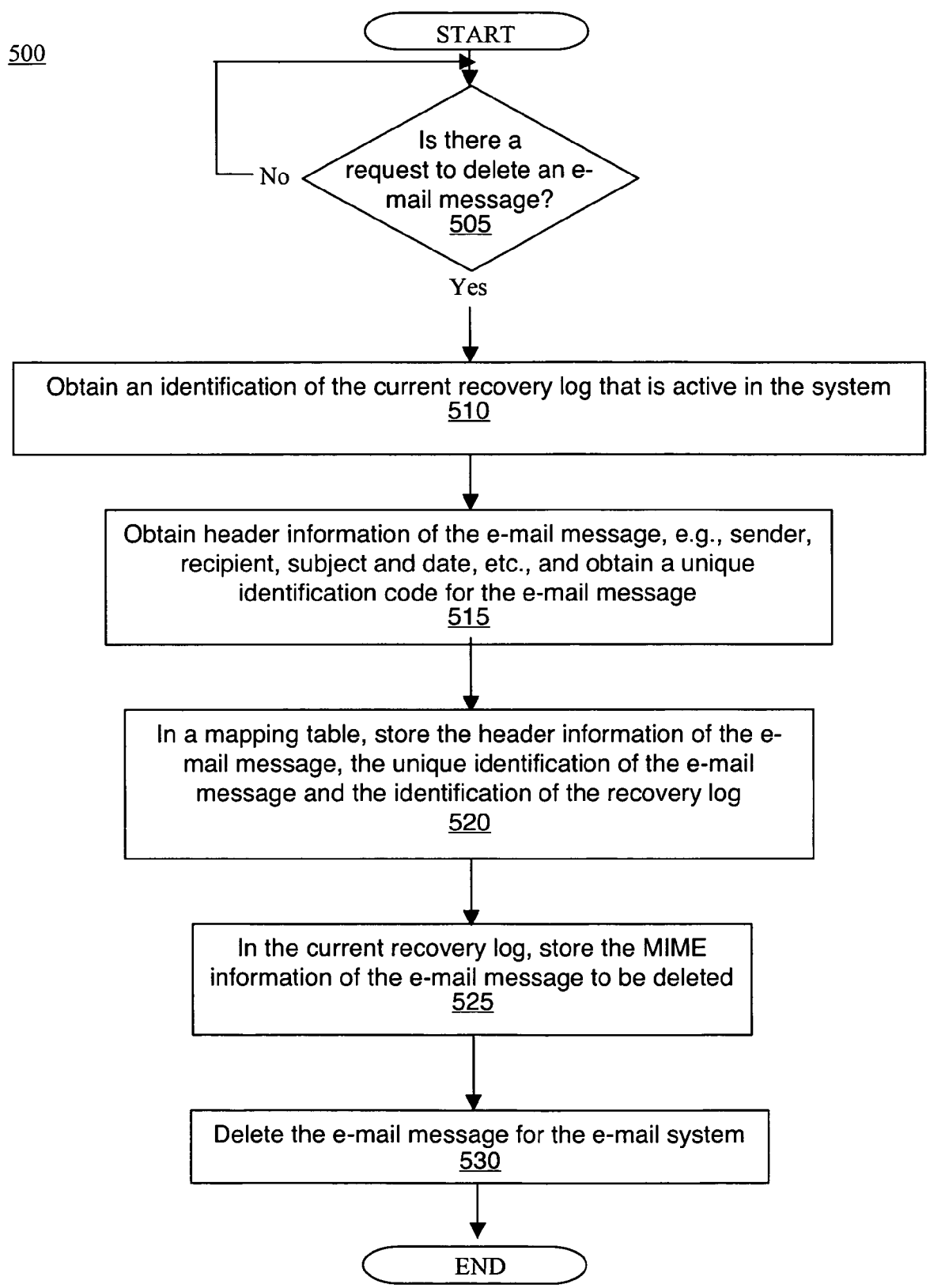
FIG. 5A is a flowchart of a process for storing deleted electronic mail messages in accordance with embodiments of the present invention.

FIG. 5A is a flowchart of a process 500 for deleting an electronic mail message, in accordance with embodiments of the present invention. Process 500 includes processes of the present invention which, in one embodiment, are carried out by processors and electrical components under the control of computer readable and computer executable instructions. The computer readable and computer executable instructions reside, for example, in data storage features such as computer usable volatile memory 202 and/or computer usable non-volatile memory 203 and/or data storage device 204 of FIG. 2. However, the computer readable and computer executable instructions may reside in any type of computer readable medium. Although specific steps are disclosed in process 500, such steps are exemplary. That is, the present invention is well suited to performing various other steps or variations of the steps recited in FIG. 5A. Within the present embodiment, it should be appreciated that the steps of process 500 may be performed by software, by firmware, by hardware or by any combination of software, firmware and hardware.

In operation 505 of process 500, messaging system 245 is operable to detect and receive requests to delete an e-mail message, in accordance with embodiments of the present invention. When messaging system 245 receives a request to delete an e-mail message, e.g., e-mail message 1015 of FIG. 4, process 500 proceeds to operation 510. If no requests to delete e-mail messages are received by messaging system 245, process 500 continues awaiting such requests. For example, a user of computer system 190 desires to delete an e-mail message and accordingly has initiated an e-mail delete process.

In operation 510 of process 500, upon receiving a request to delete an e-mail message, messaging system 245 obtains the identification of the current recovery log active in the system that is being utilized for storing deleted e-mail messages, e.g., recovery logs 160, 161 or 162, in an embodiment of the present invention. In the present example, the active system recovery log is recovery log 160 of FIG. 3 and FIG. 4.

In operation 515 of process 500, messaging system 245 obtains the header information related to the to be deleted e-mail message, in an embodiment of the present invention. Header information can include, but is not limited to, sender, recipient, subject and date associated with the e-mail message. Messaging system 245 additionally obtains an identification code for uniquely identifying the e-mail message, e.g., identifier 1015, in an embodiment of the present invention. Alternatively, messaging system 245 may create a unique identifier for the e-mail message. In the present example, the unique identifier for the deleted e-mail message is 1015, as shown in mapping table 160 and recovery log 160 of FIG. 4.

In operation 520 of process 500 and in accordance with embodiments of the present invention, messaging system 245 enters the header information, the unique identification of the e-mail message, e.g., 1015, and the identification of the active recovery log into which the deleted e-mail message is placed into a mapping table, e.g., mapping table 165 of FIG. 4. In the present example, e-mail message 1015 is shown in mapping table 165 and is associated with the active system recovery log, e.g., recovery log 160 and the database with which the recovery log is coupled, e.g., database 150, in an embodiment of the present invention.

In operation 525 of process 500 and in accordance with embodiments of the present invention, messaging system 245 enters the MIME information associated with the to be deleted e-mail message with the table information, e.g., table 176, within a particular recovery log, e.g., recovery log 160. In an embodiment of the present invention, table 176 is configured to retain e-mail messages in a MIME format. In the present example, the MIME portion of e-mail message 1015 is shown disposed in table 176 of recovery log 160.

In operation 530 of process 500, subsequent to the MIME information associated with the to be deleted e-mail message being entered into the active recovery log, e.g., recovery log 160, messaging system 245 deletes the e-mail message.

Figure 5B:
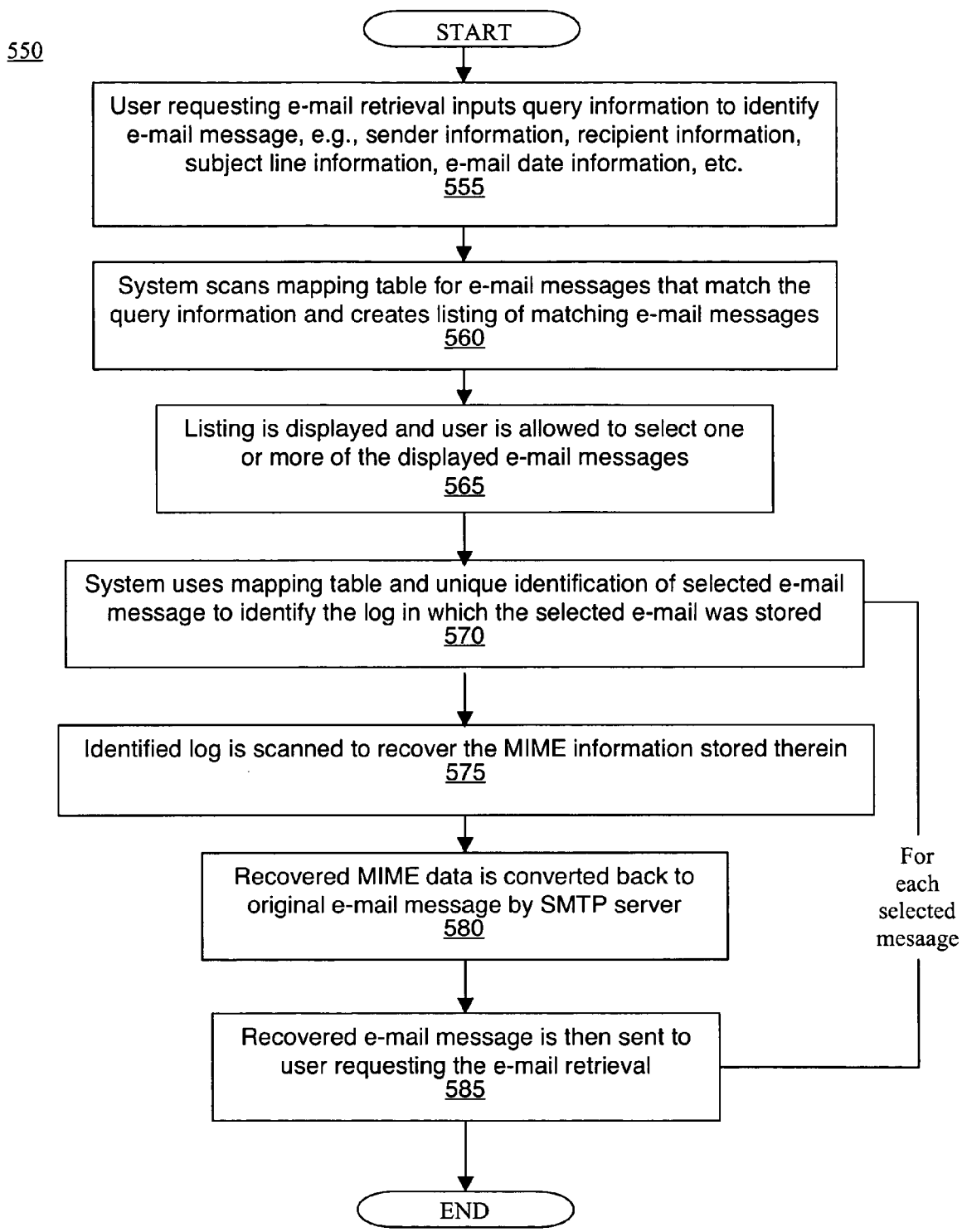
FIG. 5B is flowchart of a process for retrieving deleted electronic mail messages in accordance with embodiments of the present invention.

FIG. 5B is a flowchart of a process 550 for retrieving a deleted electronic mail message, in accordance with embodiments of the present invention. Process 550 includes processes of the present invention which, in one embodiment, are carried out by processors and electrical components under the control of computer readable and computer executable instructions. The computer readable and computer executable instructions reside, for example, in data storage features such as computer usable volatile memory 202 and/or computer usable non-volatile memory 203 and/or data storage device 204 of FIG. 2. However, the computer readable and computer executable instructions may reside in any type of computer readable medium. Although specific steps are disclosed in process 550, such steps are exemplary. That is, the present invention is well suited to performing various other steps or variations of the steps recited in FIG. 5B. Within the present embodiment, it should be appreciated that the steps of process 550 may be performed by software, by firmware, by hardware or by any combination of software, firmware and hardware.

Figure 6:
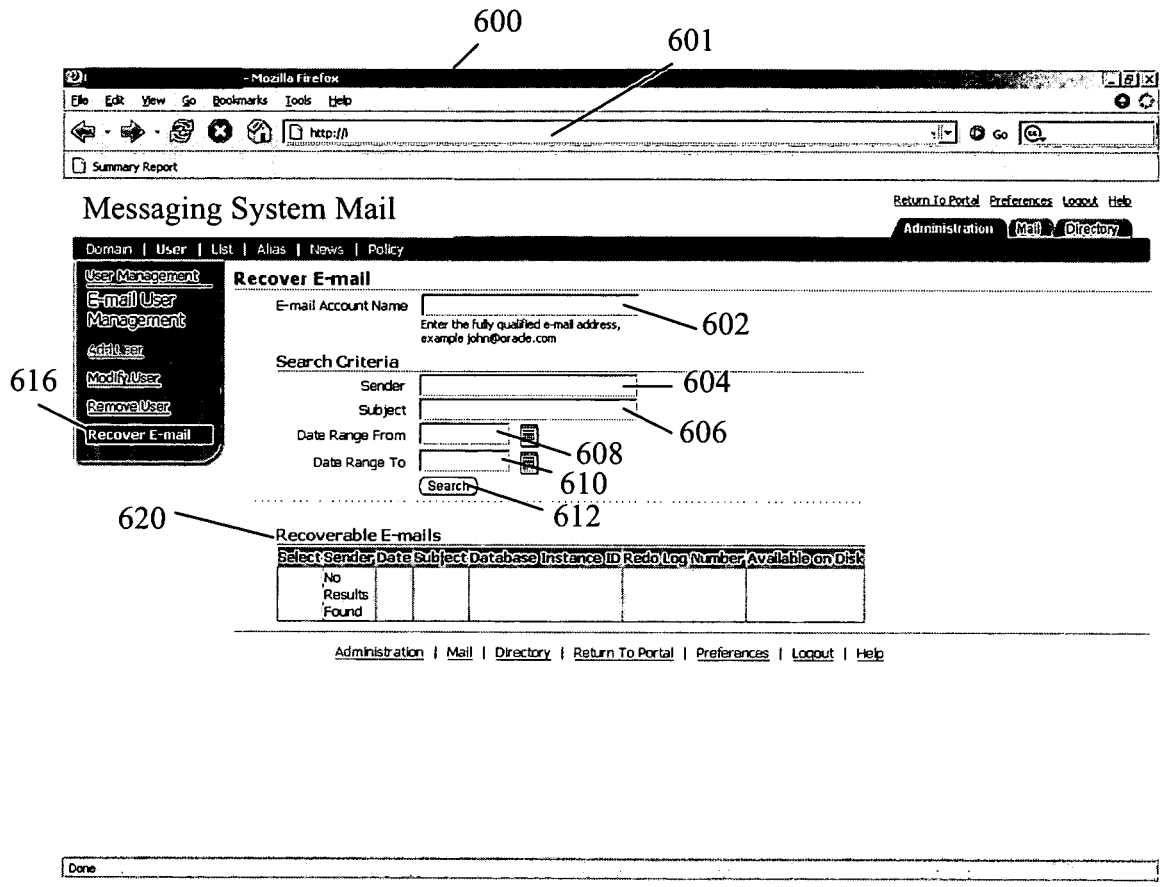
FIG. 6 is a screenshot of an initial active window through which a process of retrieving deleted electronic mail messages is commenced, in accordance with embodiments of the present invention.

In operation 555 of process 550, a user accesses an e-mail recovery web page by directing a browser, e.g., Mozilla, Internet Explorer, Netscape or any other browser, to a particular web page or pages for initiating an e-mail message recovery process, as shown in browser window 600 of FIG. 6. Continuing, the user enters pertinent information associated with the desired deleted e-mail message into the proper user interface windows displayed within a browser window, e.g., user interface windows 602-610 of browser window 600 of FIG. 6, in an embodiment of the present invention.

Continuing with operation 555, once the search information related to the deleted e-mail has been entered into the various user interface windows 602-610 via browser window 600 of FIG. 6, the user clicks on search button 612 of FIG. 6, which causes recovery mechanism 247 to query a mapping table, e.g., mapping table 165, for matches to the user entered information.

In operation 560 of process 550 of FIG. 5B, subsequent to a user selecting search button 612, a recovery mechanism, e.g., recovery mechanism 247 of FIG. 3 and FIG. 4, queries mapping table 165 for matches predicated upon the criteria entered by the user within user interface windows 602-610, e.g., e-mail message 1015, in an embodiment of the present invention. Recovery mechanism 247 then creates a listing of the matching e-mail messages and causes a user selectable display of those matching e-mail messages within the recoverable e-mail interface window 620 of FIG. 7, in accordance with an embodiment of the present invention.

Figure 7:
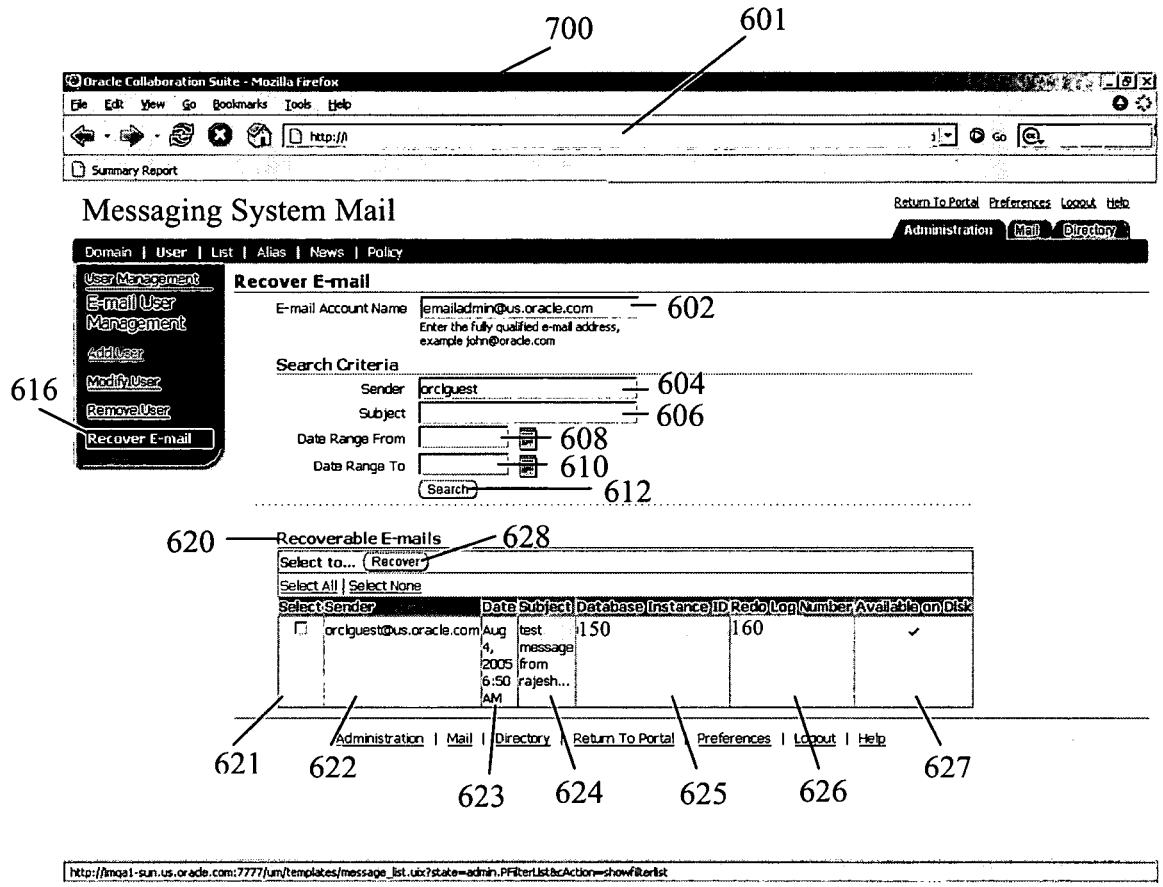
FIG. 7 is a sequential screenshot of the active window of FIG. 6, subsequent to criteria submitted and which indicates those instances of recoverable electronic mail messages, in accordance with embodiments of the present invention.

In operation 565 of process 550, the user utilizes browser window 700 to select one or more e-mail messages via recoverable e-mail interface window 620, particularly utilizing e-mail message selector section 621 of FIG. 7. E-mail message selector section 621 enables a user to particularly select those e-mail messages that the user desires to recover. Upon a user selecting those e-mail messages that are desired via selector section 621, the user then selects recover button 628 to initiate the recovery process.

In operation 570 of process 555, upon a user selecting recover button 628, recovery mechanism 247 then utilizes the known message IDs of the selected e-mails to index the mapping table to obtain the identified active system recovery log storing the MIME information associated with the deleted e-mail message to be recovered.

In operation 575 of process 555, the table containing the MIME information associated with the identified recovery log 160 is then scanned by recovery mechanism 247 to recover the MIME information related to the desired e-mail message. In the exemplary example, table 176, in recovery log 160 of FIG. 4, contains the matching e-mail message in a MIME format that is identified using its associated message ID, e.g., message ID number 1015. By virtue of mapping table 165 containing information related to the recover log in which the desired e-mail message is stored, recovery mechanism 247 directly examines the MIME table in the recovery log, e.g., table 176 in recovery log 160, instead of examining all the tables within a recovery log. Advantageously, this achieves a reduction in the time consumed in an e-mail message retrieval process.

In operation 580 of process 550, once the user selected e-mail message has been retrieved from its associated table, e.g., table 176 of recovery log 160, a mail server, e.g., mail server 236 of FIG. 2, transforms the MIME data to a recovered e-mail message and forwards the recovered e-mail message to the requesting user's electronic mail inbox. It is noted that in an alternative embodiment of the present invention, the recovered e-mail message may be forwarded to a particular folder in the user's e-mail mailbox. It is further noted that in yet another embodiment, the recovered e-mail message may be forwarded to the user's e-mail folder from which the e-mail message was originally deleted.

Figure 8:
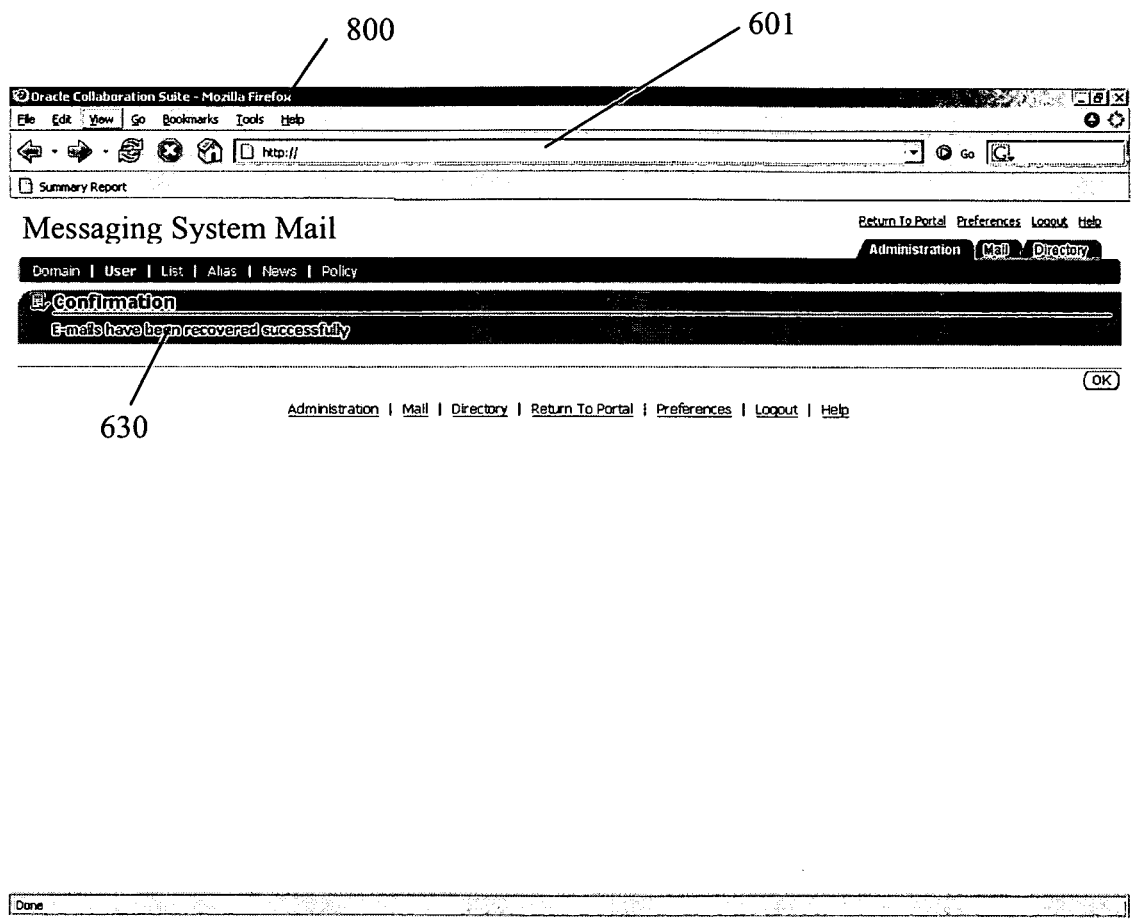
FIG. 8 is a sequential screenshot of the active window of FIG. 7 indicating that the retrieval of the desired electronic mail messages was successful.

In operation 585 of process 550, subsequent to mail server 236 forwarding the recovered e-mail message to the requesting user's e-mail inbox, the user is presented with an e-mail recover confirmation page, e.g., confirmation window 530 of browser display 800 of FIG. 8, indicating successful recovery of the intended e-mail message, in an embodiment of the present invention.

In accordance with embodiments of the present invention, once presented with browser window 800 of FIG. 8, indicating successful e-mail message recovery, the user may then utilize their e-mail program to access the recovered e-mail message(s).

Still referring to process 550 of FIG. 5B, it is particularly noted that operations 570, 575, 580 and 585 are each performed for each instance of an e-mail message that is to be recovered, in accordance with embodiments of the present invention.

FIG. 6 is a screenshot of an initial active window display presented on a display device, e.g., display device 205 of FIG. 2, in conjunction with a process 550 for retrieving deleted e-mail messages, in accordance with embodiments of the present invention. FIG. 6 includes a browser 600 for facilitating the retrieval process. In the embodiment shown, browser 600 is a Mozilla browser by Firefox. It is noted that nearly any browser including, but not limited to, Internet Explorer by Microsoft, Netscape Navigator by Netscape, Safari by Apple may be utilized as browser 600.

Within browser 600, shown is a uniform resource locator (URL) window 601 in which a user would enter the proper URL address, e.g., http://www.xxx.xxx, to direct browser 600 to access one or more web pages that is/are utilized during the retrieval process. Browser 600 further includes user interface windows 602, 604, 606, 608 and 610 for searching the stored header information of the mapping table. In an embodiment, each user interface window is associated with a field the mapping table. In the present embodiment, user interface window 602 allows for entering the recipient's e-mail address. Continuing, user interface window 604 allows for entering the sender of the deleted e-mail. User interface window 606 allows for entering the subject of the deleted e-mail. User interface windows 608 and 610 allow for entering date ranges from and to a particular date, respectively. It is particularly noted that additional user interface windows associated with other fields disposed in the mapping table may be added to the shown user interface windows within browser 600, thus providing additional criteria with which mining mechanism 246 may utilize to recover a desired deleted electronic mail message.

Browser window 600 in FIG. 6 also includes a search button 612 for initiating mining mechanism 246 to examine recovery log 160 for the deleted e-mail. Once a requester has entered necessary and/or known information related to the deleted e-mail, as shown in user interface windows 602-610, the requester would click on search button 612 to commence the search of the header information of the mapping table for the particular e-mail.

Browser window 600 additionally includes a recoverable e-mail display section 620 in which mining mechanism 246 causes to be displayed therewithin information related to those e-mails that were discovered in mapping table 165 utilizing the criteria presented in user interface windows 602, 604, 606, 608 and 610. In an embodiment, the information related to the recoverable e-mail can include, but is not limited to, sender, date, subject, a database reference number (instance ID), the number of the recovery log in which the information was stored, e.g., recovery log 160, and whether the recoverable e-mail is located on a disk, e.g., data storage device 204 of FIG. 2.

Browser window 600 in FIG. 6 further includes a drop down menu 616 for specifying the function to be performed in conjunction with browser window 600. In the embodiment shown, browser window 600 is displaying that which is used to retrieve e-mail.

FIG. 7 is an illustration of browser window 700, which is a sequential illustration of browser window 600 of FIG. 6, subsequent to search button 612 having been clicked in accordance with embodiments of the present invention. Within user interface window 602, the address of the intended recipient and/or addressee is shown therein, confirming that portion of the entered criteria. Shown entered by the requester within user interface window 604 was sender information, particularly the sender's user name. In the example shown in FIG. 6, the requester utilized two criteria to facilitate the retrieval of the deleted e-mail, the e-mail address of the addressee, and the sender's name.

In an alternative embodiment, additional criteria may be entered within the existing user interface windows to enhance the search result. It is also noted that in yet another embodiment, additional user interface windows may be implemented such that additional criteria may be used to further enhance the search result.

FIG. 7 also shows, within retrievable e-mail display section 620, in an embodiment of the present invention, that/those deleted e-mail(s) that was/were stored in recovery log 160 and which match the provided criteria entered by the requester and are displayed to the requester. In display sub-section 621 there is a select box with which the user may select that/those e-mail(s) desired. When a plurality of deleted emails are presented to the user, the select feature enables the user to select the e-mail(s) that is/are desired.

Continuing with display section 620 of FIG. 7, in display sub-section 622 the sender's e-mail address, including user name and domain, and which is associated with the retrievable e-mail is shown, in display sub-section 623 the date of a retrievable e-mail is shown, in display sub-section 624 the subject of the retrievable e-mail is shown, in display sub-section 625 the user is informed of the database instance identification related to the retrievable e-mail, in display sub-section 626 the user is informed of the recovery log number in which the retrievable e-mail is located, e.g., recovery log 160, and in display sub-section 627 the user is informed if the retrievable e-mail is located on a disk, e.g., data storage device 204 of FIG. 2.

By informing the user/requester of those e-mails that match the criteria, the user is enabled to more precisely retrieve those deleted e-mails desired by the user. It is noted that the subsections within display section 620, e.g., display sections 621-627 are exemplary in nature and as such should not be construed as a limitation. In fact, display section 620 may be comprised of fewer or greater numbers of subsections.

Once the user/requester has selected the desired retrievable e-mails, e.g., clicking on one or more shown e-mails, the user would then 'click' on recover button 628, causing an application programming interface operable therewith, e.g., recovery mechanism 247 to retrieve the user selected and retrievable e-mail from the identified recovery log.

FIG. 8 is an illustration of a browser window 800, which is a sequential illustration of browser window 700 of FIG. 7, that is presented to the user subsequent to the user/requester having clicked on recover button 628, and which indicates to the user/requested that the desired e-mails have been successfully retrieved. This is shown within confirmation window 630.

Subsequent to being presented with browser window 800 of FIG. 8, the user would then access their e-mail account mailbox in a manner appropriate for the electronic mail system operable in conjunction with computer system 200 (FIG. 2) and network 100 (FIG. 1). Upon accessing their e-mail account mailbox, the user would find the recovered e-mail message(s) having been sent to the user by messaging system 245, in an embodiment of the present invention. In accordance with embodiments of the present invention, forwarding of the recovered e-mail message(s) may be performed by a mail server, e.g., mail server 236 of FIG. 2.

In an embodiment of the present invention, the recovered emails may be sent to the user's e-mail inbox. In an alternative embodiment, the recovered emails may be sent to an associated folder within the user's e-mail inbox. In yet another embodiment, the recovered email may be sent to the folder from which the e-mail was deleted. It is noted that in still another embodiment, the recovered email may be sent to wherever the user desires.

Still referring to FIG. 8, in an embodiment of the present invention, an SMTP (simple mail transfer protocol) mail server may be implemented as mail server 236 to send the recovered e-mail to the user. In another embodiment, alternative protocols may be utilized. It is noted that nearly any mailing protocol, properly configured, may be used to send the recovered e-mail to the requesting user.

Thus, embodiments of the present invention are drawn to providing a method and system for efficiently recovering deleted electronic mail messages through recovery log and mapping table utilization. Further, by virtue of logically storing deleted e-mail messages in a recovery log, retrieval of those deleted e-mails advantageously consumes substantially less time and fewer system resources when compared to conventional e-mail recovery processes. Additionally, utilization of the web based access mechanism described herein enables a user to particularly select those deleted e-mails that are desired, also providing a substantial reduction in retrieval time.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method of recovering an electronic mail message in a computer system, said method comprising:

accessing, by a computer system, a user generated query identifying a portion of said electronic mail message;

searching, by said computer system, a first table of stored header information to identify one or more electronic mail message candidates that match said query, the first table being stored in a computer-readable medium in communication with said processor and providing a first mapping that associates message identifiers of a plurality of deleted electronic mail messages with a plurality of recovery logs;

in response to a user selecting a first electronic mail message of said message candidates, obtaining, by said computer system, a message identifier identifying said first electronic mail message;

identifying, by said computer system, a selected recovery log from said plurality of recovery logs using said first mapping, said first mapping stored in said first table as an association between said message identifier and said selected recovery log; and identifying, by said computer system, a message information record from a plurality of message information records stored in said selected recovery log using a second mapping, said second mapping stored in said selected recovery log as an association between said message identifier and said message information record, wherein distinct subsets of the plurality of deleted electronic mail messages are stored in distinct recovery logs according to the first mapping; and recovering, by said computer system, said portion of said first electronic mail message from said message information record.

2. A method as described in claim 1 wherein said log is a redo log.

3. A method as described in claim 1 wherein said header information contains sender information, receiver information, and subject line information for deleted electronic mail messages.

4. A method as described in claim 3 wherein said table further comprises a mapping between unique codes identifying deleted electronic mail messages and logs in which portions of said deleted electronic mail messages are stored.

5. A method as described in claim 1 wherein said portion of said first electronic mail message is a MIME formatted portion.

6. A method as described in claim 5 further comprising converting, by said computer system, said portion of said first electronic mail message into a complete version of said first electronic mail message using an electronic mail server.

7. A method as described in claim 6 further comprising transmitting, by said computer system, said complete version of said first electronic mail message to said user.

8. A method as described in claim 1 further comprising displaying, by said computer system, identifying information related to said electronic mail message candidates on a display as part of a graphical user interface.

9. A computer system comprising:
a processor;
a mapping table stored on a computer-readable medium and linking unique identifiers of deleted electronic mail messages to a plurality of recovery logs, the recovery logs storing portions of the deleted electronic mail messages; and
a memory coupled to a processor, said memory storing instructions to implement a method of recovering an electronic mail message, said method comprising:
in response to a request to delete a specified electronic mail message, storing header information and a unique code of the first electronic mail message to the mapping table;
accessing a user generated query identifying a portion of the specified electronic mail message;
searching a first table of stored header information to identify one or more electronic mail message candidates that match said query, the first table being stored in a computer-readable medium in communication with said processor and providing a first mapping that associates message identifiers of a plurality of deleted electronic mail messages with a plurality of recovery logs;
in response to a user selecting a first electronic mail message of said message candidates, obtaining a message identifier identifying said first electronic mail message;
identifying a selected recovery log from said plurality of recovery logs using said first mapping, said first mapping stored in said first table as an association between said message identifier and said selected recovery log; and
identifying a message information record from a plurality of message information records stored in said selected recovery log using a second mapping, said second mapping stored in said selected recovery log as an association between said message identifier and said message information record,
wherein distinct subsets of the plurality of deleted electronic mail messages are stored in distinct recovery logs according to the first mapping; and
recovering said portion of said first electronic mail message from said message information record.

10. A computer system as described in claim 9 wherein said identified recovery log is a redo log.

11. A computer system as described in claim 9 wherein said header information contains sender information, receiver information and subject line information for deleted electronic mail messages.

12. A computer system as described in claim 9 wherein said portion of said first electronic mail message is a MIME formatted portion.

13. A computer system as described in claim 12 further comprising converting said portion of said first electronic mail message into a complete version of said first electronic mail message using an electronic mail server.

14. A computer system method as described in claim 13 further comprising transmitting said complete version of said first electronic mail message to said user.

15. A computer system as described in claim 9 further comprising displaying information related to said electronic mail message candidates on a display as part of a graphical user interface.

16. A computer-implemented method of deleting a selected electronic mail message from a mail account, said method comprising:
in response to a request to delete said selected electronic mail message, performing the following by a computer system:
identifying, by the computer system, a current recovery log from among a plurality of recovery logs stored in a computer-readable medium in communication with said processor,
wherein distinct subsets of a plurality of deleted electronic mail messages are stored in distinct recovery logs according to the first mapping;
storing, by the computer system, header information of said selected electronic mail message to a mapping table;
storing into said mapping table, by the computer system, a first mapping between said current recovery log and an identifier uniquely identifying said selected electronic mail message;
storing into a second table in said current recovery log, by the computer system, a portion of said selected electronic mail message in association with said identifier uniquely identifying said selected electronic mail message; and deleting, by the computer system, said selected electronic mail message from said mail account.

17. A method as described in claim 16 wherein said portion of said electronic mail message is a MIME format.

18. A method as described in claim 16 wherein said recovery log is a redo log.

19. A method as described in claim 16 wherein said mapping table comprises respective mappings between a plurality of deleted electronic mail messages and logs into which portions of said deleted electronic mail messages are stored.

20. The system of claim 9, wherein the recovery log identified from among the plurality of recovery logs comprises a plurality of tables, each table storing records associating a plurality of unique electronic mail message identifiers and respective portions of the electronic mail messages.

21. A method as described in claim 1, further comprising:
storing, by said computer system, said plurality of recovery logs, each of said plurality of recovery logs storing different portions of electronic mail messages than each of the other of said plurality of recovery logs, or a combination thereof.

22. A method as described in claim 1, further comprising:
storing, by said computer system, said plurality of recovery logs; and
identifying, by said computer system, one of said plurality of recovery logs as an active recovery log;
wherein, during operation the computer system, the computer system stores deleted electronic mail messages only in the active recovery log.

23. A method as described in claim 22, further comprising:
periodically identifying, by said computer system, a different one of said plurality of recovery logs as the active recovery log.

* * * * *

UNITED STATES PATENT AND TRADEMARK OFFICE
CERTIFICATE OF CORRECTION

PATENT NO.        : 8,533,271 B2                                            Page 1 of 1
APPLICATION NO.   : 11/351372
DATED             : September 10, 2013
INVENTOR(S)       : Gupta It is certified that error appears in the above-identified patent and that said Letters Patent is hereby corrected as shown below:

In the Specification:

In column 4, line 52, delete "alterative" and insert --alternative--, therefor.

In column 7, line 10, delete "and or" and insert --and/or--, therefor.

In column 9, line 15, delete "MME" and insert --MIME--, therefor.

In the Claims:

In column 16, line 39, in Claim 14, after "system" delete "method".

Signed and Sealed this
Tenth Day of December, 2013

Margaret A. Focarino
*Commissioner for Patents of the United States Patent and Trademark Office*